United States Patent [19]

Redele

[11] Patent Number: 4,519,358
[45] Date of Patent: May 28, 1985

[54] FUEL HEATING METHOD AND DEVICE FOR VEHICLES

[75] Inventor: Jean E. A. Redele, Paris, France

[73] Assignee: Sxoma-Energie, Paris, France

[21] Appl. No.: 582,502

[22] Filed: Feb. 22, 1984

[30] Foreign Application Priority Data

Feb. 22, 1983 [FR] France ............... 83 02821

[51] Int. Cl.³ .................................. F02M 31/00
[52] U.S. Cl. ................................ 123/557; 123/514
[58] Field of Search ............... 123/514, 516, 557, 558

[56] References Cited

U.S. PATENT DOCUMENTS

| | | | |
|---|---|---|---|
| 1,319,718 | 10/1919 | Martin | 123/557 |
| 4,106,455 | 8/1978 | Vance | 123/557 |
| 4,187,813 | 2/1980 | Stumpp | 123/557 |
| 4,326,492 | 4/1982 | Leibrand | 123/557 |
| 4,343,283 | 8/1982 | Shepherd | 123/514 |
| 4,377,149 | 3/1983 | Naylor | 123/516 |
| 4,395,995 | 8/1983 | Crain | 123/516 |
| 4,403,590 | 9/1983 | Davis | 123/557 |
| 4,411,239 | 10/1983 | Kelch | 123/516 |
| 4,432,329 | 2/1984 | Redele | 123/516 |

FOREIGN PATENT DOCUMENTS 2841768  4/1980  Fed. Rep. of Germany ...... 123/514

Primary Examiner—Ronald H. Lazarus
Attorney, Agent, or Firm—Sughrue, Mion, Zinn, Macpeak and Seas

[57] ABSTRACT

In a method and device for heating fuel for internal combustion, especially diesel, motors, the fuel is heated in a heat exchanger as a result of heat exchange with the cooling water and the lubricating oil of the motor. The heat exchanger comprises three circuits combined in a bundle of parallel channels.

6 Claims, 5 Drawing Figures

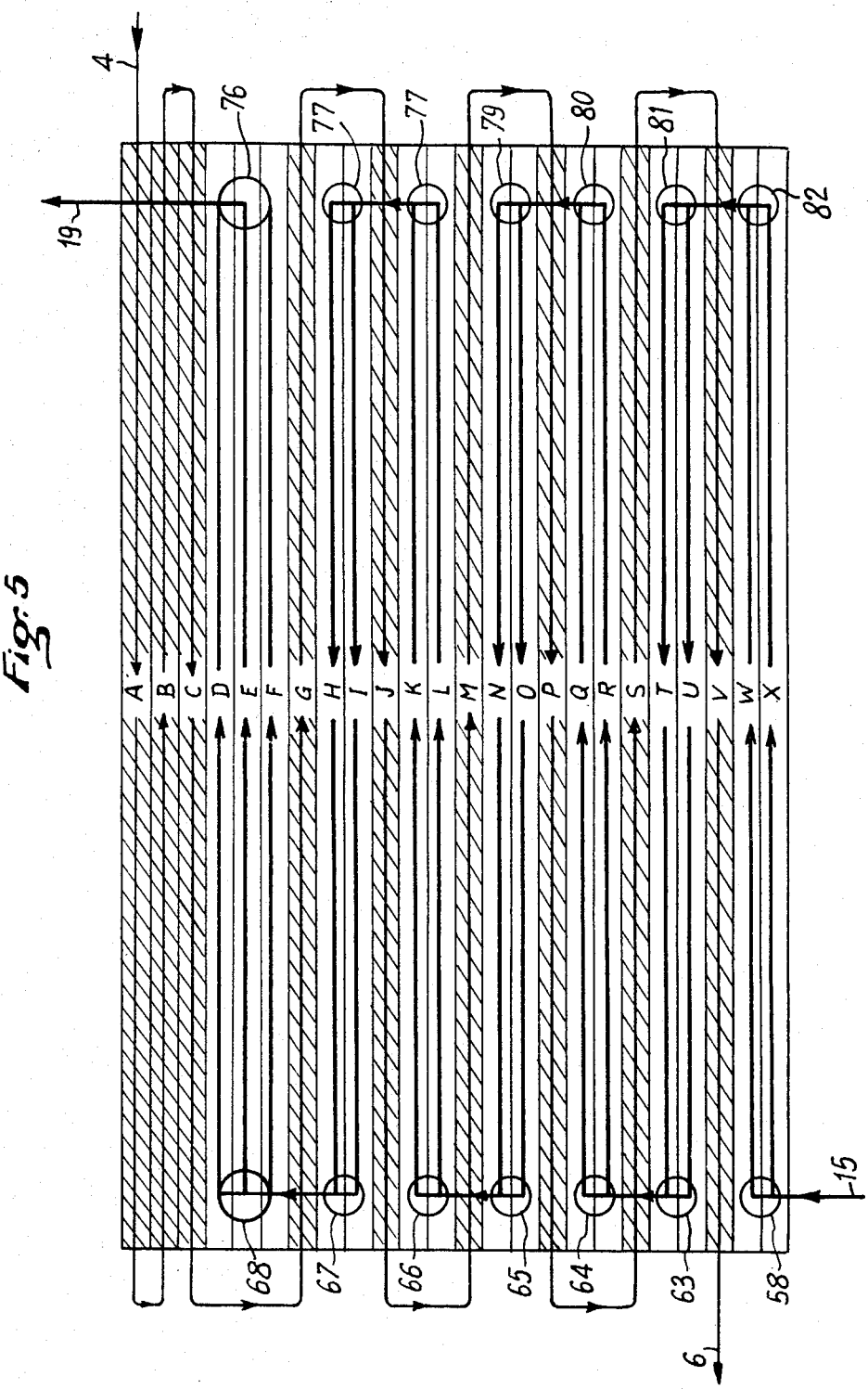

FUEL HEATING METHOD AND DEVICE FOR VEHICLES

BACKGROUND OF THE INVENTION

1. Field of the Invention

The object of the present invention is a heat exchange method and device, especially for heating the fuel in diesel motors.

2. Description of the Prior Art

It has been shown that under certain conditions heating a fuel, especially diesel fuel, leads to significant economies in fuel consumption, without loss of power or deterioration of other motor operating characteristics.

One prior art disclosure (French Patent 82 13066 dated July 22, 1982) states that the fuel should be heated to a temperature of at least 70° to 80° C. The water in the motor cooling circuit would seem at first sight to be a convenient or at least free source of heat. It has already been proposed to use the motor cooling water to heat the fuel in cold weather (French Patent 81 13417 dated July 8, 1981).

SUMMARY OF THE INVENTION

In one aspect the invention consists in a method for heating the fuel for a motor, wherein thermal exchange is effected simultaneously between the fuel to be heated, the motor lubricating oil and the motor cooling liquid.

It is known that during normal operation of a motor the lubricating oil may reach temperatures of the order of 100° to 140° C. A very broad range of high temperatures is thus available. By determining the relative size of the exchange surfaces and the flowrates it is possible to select at will a temperature to which to heat the fuel equal to or greater than that of the water in the cooling circuit, up to temperatures in excess of 100° C.

In another aspect, the invention consists in a device for heating the fuel of a motor, comprising a heat exchanger having three circuits in the form of a circuit for the motor cooling liquid, a circuit for the fuel and a circuit for the motor lubricating oil, and further comprising respective heat exchange surfaces between said oil circuit and said fuel circuit, between said cooling liquid circuit and said fuel circuit and between said oil circuit and said cooling liquid circuit.

Other objects and advantages will appear from the following description of an example of the invention, when considered in connection with the accompanying drawings, and the novel features will be particularly pointed out in the appended claims.

BRIEF DESCRIPTION OF THE DRAWINGS

FIG. 5 is a schematic diagram showing the circulation of oil and fuel in an outer section of the exchanger.

DESCRIPTION OF THE PREFERRED EMBODIMENT

The device in accordance with the invention is used simultaneously to heat the fuel, in this instance the diesel fuel for a diesel motor, and to cool the lubricating oil. This application is not limiting, the device being usable in other injection type motors, for example. The device is placed in the diesel fuel circuit. It may be placed on the inlet or outlet side of the injector pump, as explained in the aforementioned French Patent. In the following example, the device in accordance with the invention is mounted on the inlet side of the injection system.

Figure 1:
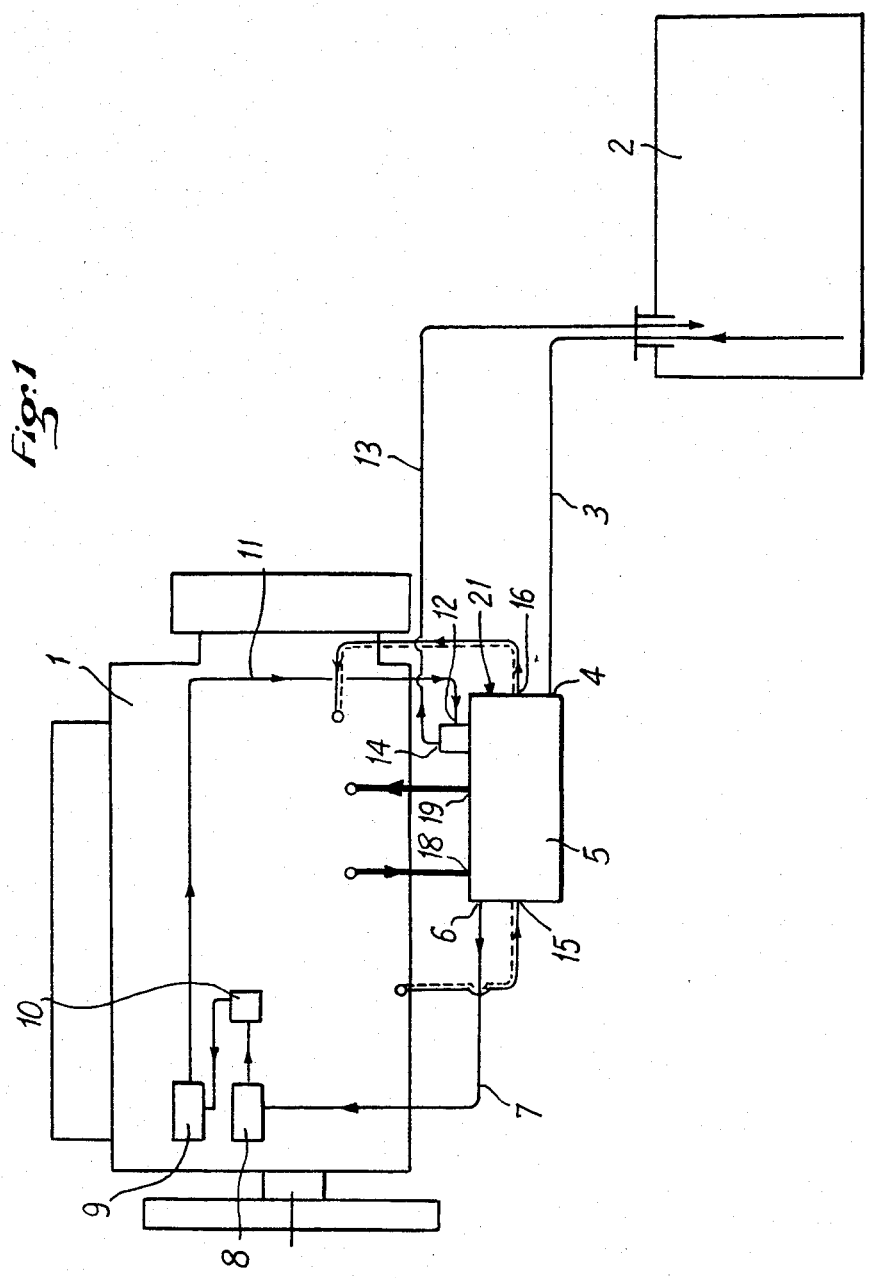
FIG. 1 is a schematic diagram showing the circulation of fuel in the case of a diesel motor equipped with a device in accordance with the present invention.

FIG. 1 shows schematically a motor 1 equipped with a device in accordance with the invention. The diesel fuel tank 2 is connected by a pipe 3 to an inlet 4 of an exchanger device 5 in accordance with the invention. The heated diesel fuel exits at 6 and is passed by a pipe 7 firstly to a feed pump 8 and then to an injector pump 9 after being passed through a filter 10. A return pipe 11 returns excess diesel fuel from the injector pump to an inlet 12 and a pipe 13 returns excess diesel fuel from an outlet 14 of the exchanger to the tank. The exchanger further comprises an inlet 15 and an outlet 16 for water and an inlet 18 and an outlet 19 for oil. These inlets and outlets 15, 16, 18 and 19 are appropriately connected to the corresponding circuits. An electrical socket 21 is used to connect a heater resistor provided within the device.

In accordance with one characteristic of the invention, a tank is associated with the exchanger. This tank, which may comprise a heating coil 27 or any other heating means, provides for maintaining a quantity of diesel fuel at the correct temperature when the motor is stopped, to provide for starting up under the best possible conditions. It also provides for additional heating when the outside temperature is very low.

Figure 2:
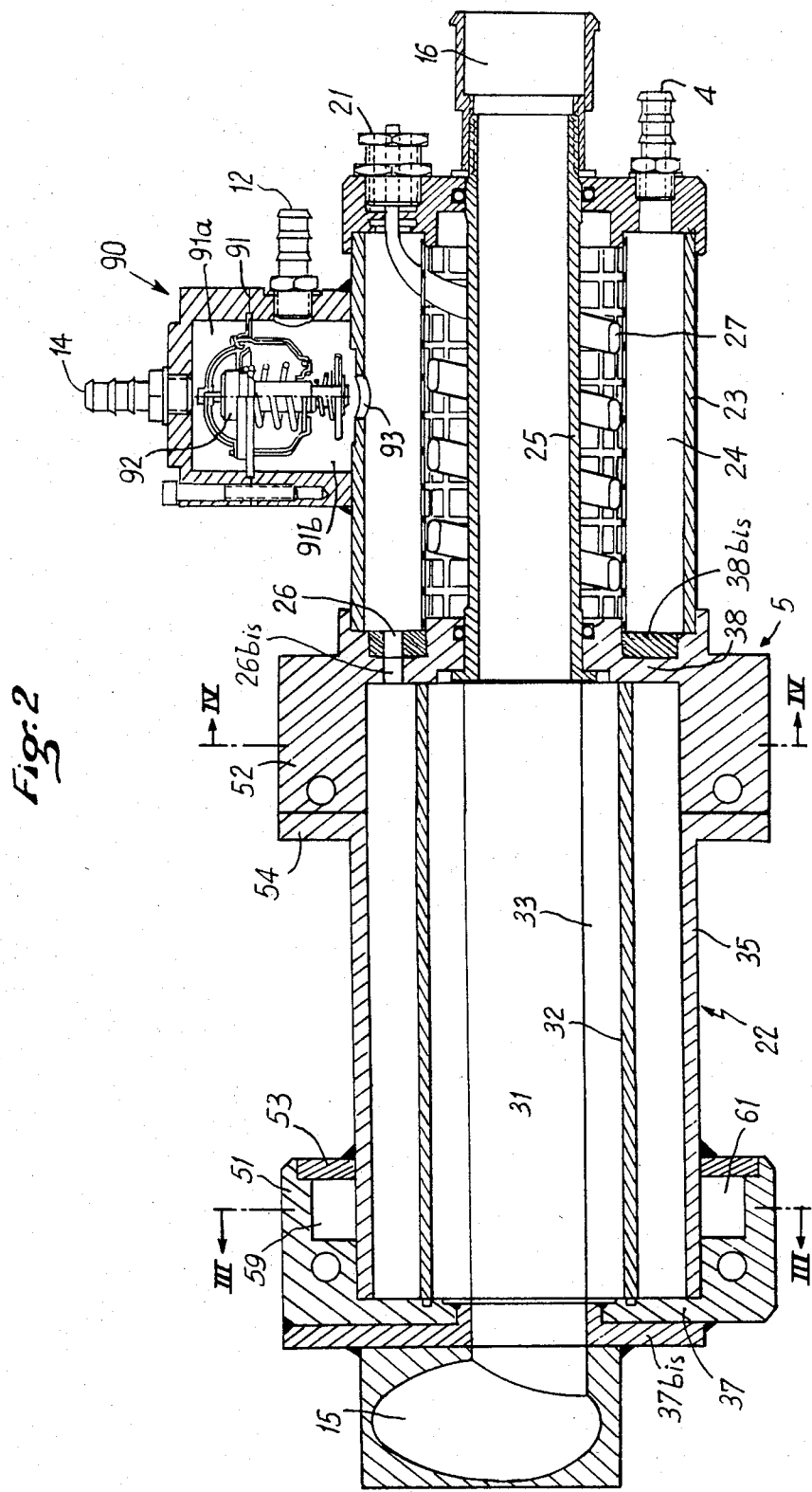
FIG. 2 is a view in axial cross-section of a device in accordance with the invention by means of which the method in accordance with the invention may be put into practice.
Figure 3:
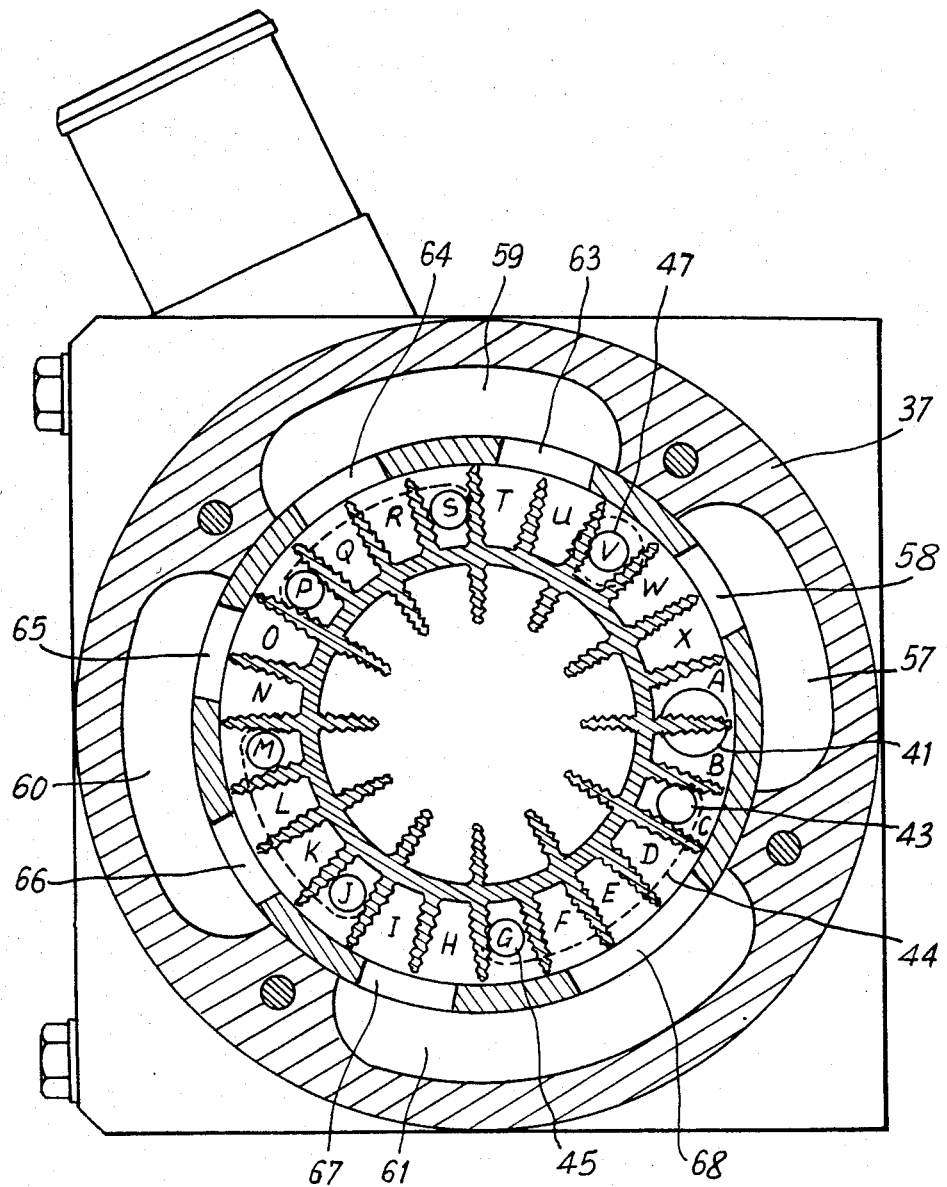
FIG. 3 is a view in cross-section on the plane indicated III—III in FIG. 1.
Figure 4:
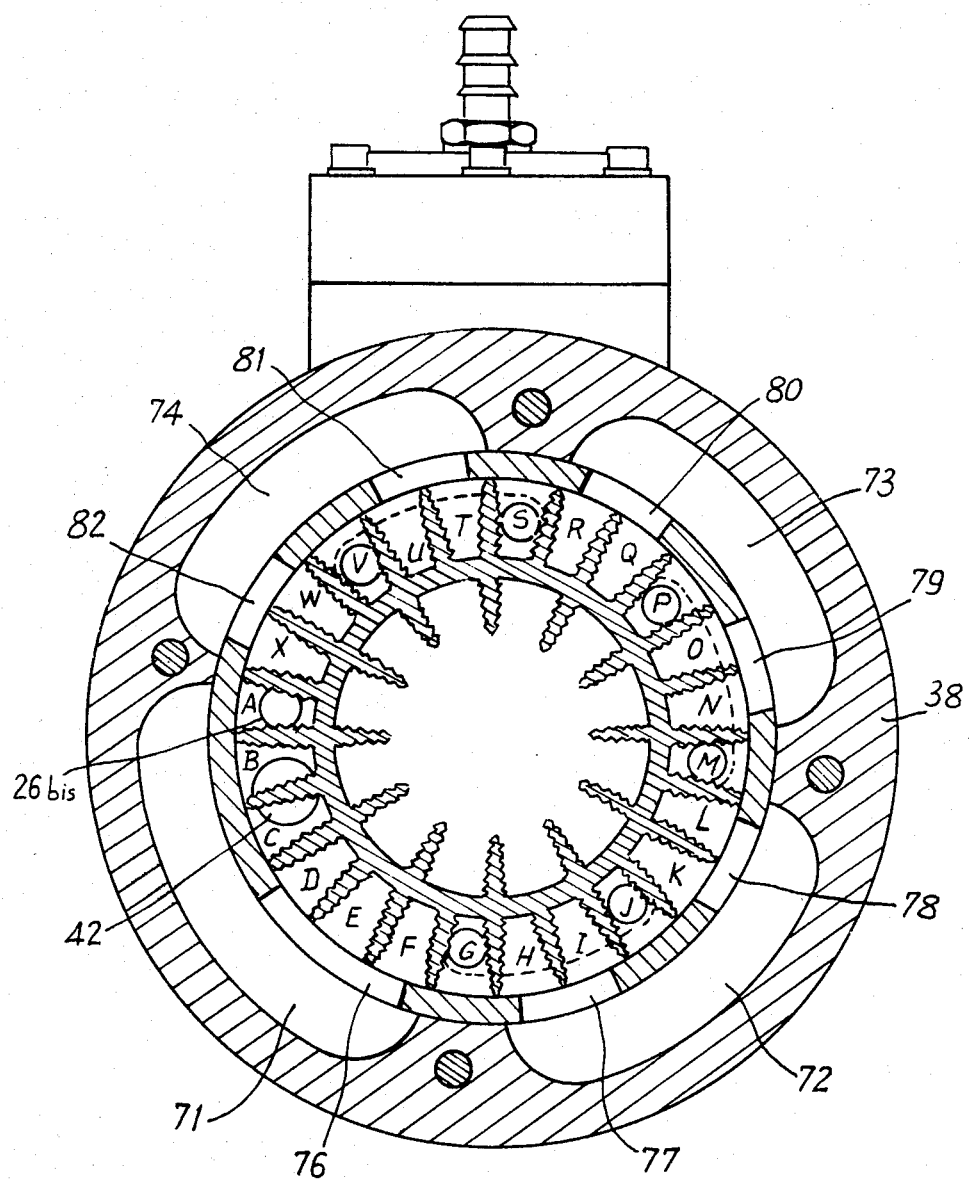
FIG. 4 is a view in cross-section on the plane indicated IV—IV in FIG. 1.

The device 5 as shown in FIGS. 2 to 4 comprises two parts: an exchanger 22 on the left of the figure and a pre-heater tank 23 on the right. These two parts are substantially cylindrical and disposed one after the other along a common axis. This arrangement is merely one example. The two parts could be of non-cylindrical shape and of different shapes to one another. The tank could be disposed around the exchanger, for example.

In the embodiment shown, the water (or other motor cooling liquid) is passed successively through the exchanger 22 and the tank 23, travelling along the center of each. The water enters hot (with the motor running) on the left at inlet 15 and exits on the right at outlet 16.

The pre-heater tank comprises a chamber 24 surrounding a water tube 25. A fuel inlet 4 is provided, preferably at a point distant from the exchanger to avoid stagnation areas, and an outlet 26 establishes communication between the chamber 24 and the exchanger 22. A heating coil 27 with appropriate connection means 21 is disposed within the tank 23. The heating coil comprises an electrical resistor and a temperature regulator maintaining a selected temperature in the diesel fuel in the tank 24. This temperature is advantageously less than the temperature to which the diesel fuel is heated under normal conditions. Starting would be facilitated and the heating coil would be switched in automatically if, as a result of extremely severe climatic conditions, for example, the heating provided by the exchanger proved insufficient.

In the embodiment shown, the exchanger comprises a bundle of parallel channels (A–X) with connections at the ends of the bundle to determine three circuits for the entry 57, 58 and the exit 76, 71 of oil, the entry 15 and the exit 16 of water and the entry 26bis and the exit 47 of fuel, each of the circuits comprising at least one run of the bundle of channels over its length and, where appropriate, connections 41, 42, 44, 59, 61, 72, 73, 74 at the ends of the bundle to constitute at least one circuit comprising at least two runs of the full length. In the embodiment shown, the exchanger comprises a central channel 31 delimited by a substantially circular wall 32 provided with fins 33 directed towards the center of the channel 31. As shown in FIGS. 3 and 4, the fins have a ribbed, grooved or knurled surface so as to increase the surface area for thermal exchange. The exchanger is delimited by a jacket 35 which may be cylindrical. The space between the wall 32 of the central channel and the jacket 35 is divided into 24 channels referenced A to X of which certain are used to circulate oil and others to circulate diesel fuel. The walls separating the channels are ribbed to increase the surface area for thermal exchange. The ends of the exchanger are closed off by lefthand and righthand plates 37 and 38 forming flanges. To provide for the circulation of the oil and the diesel fuel, openings may be formed at the two ends of the exchanger in the flanges 37, 38 and/or in the jacket 35 and these openings appropriately connected to one another and to the corresponding circuits. Thus it is possible to have oil and diesel fuel in alternate channels or in alternate pairs of channels. An overall counterflow arrangement may be provided with several channels or groups of channels in parallel, and it is possible to provide for alternate circulation from right to left and vice versa. Thus it is possible to provide cavities in the internal surfaces of the flanges, linking two or more than two channels. The cavities may be perforations closed off on the outside by plugs 37bis and 38bis.

In the embodiment shown, the fuel circuit leaves the tank through the orifice 26 in the plug 38bis and enters the channel A through the orifice 26bis in the flange 38, opposite the orifice 26, and within the profile of channel A, as can be seen in FIG. 4. At the other end of the exchanger a bore 41 is formed in the flange 37 linking channels A and B. The fuel circuit therefore comprises channel A in the direction from right to left, extends through the bore 41 and continues towards the right via channel 8. On the flange 38 (FIG. 4) a bore 42 is formed linking channels B and C. The fuel circuit arriving on the right via channel B continues towards the left via channel C. In the flange 37 (FIG. 3) a bore 43 is formed facing channel C and communicates by means of a groove 44 formed on the external surface of the flange 37 with a bore 45 formed through the flange 37 within the profile of channel G. The fuel circuit via the groove 44 is extended in the direction from left to right via channel G. The fuel circuit thus extends to the outlet via the bore 47 formed in the flange 37 facing channel V and which corresponds to the outlet referenced 6 in FIG. 1.

The oil circuit could be formed in the same manner. By way of example, in one embodiment, communication is established between the channels in the outer section of the exchanger by means of openings such as 63, 64, 81, 82 formed in the lateral wall of these channels, these openings communicating by means of appropriate passages 59, 74. The oil circuit passes from one channel to another by means of bores formed at the righthand and lefthand ends of the exchanger through the jacket 35 and the exchanger, and these bores communicate by means of cavities formed in the internal walls of the sleeves surrounding the exchanger in the corresponding areas. These sleeves may be skirts 51 and 52 on the flanges 37 and 38 and extending from the ends over the lateral or cylindrical wall of the jacket 35. For reasons of construction technology, these cavities may be closed off towards the center of the exchanger by annular members 53, 54 welded on or otherwise attached, where necessary with appropriate seals. The sleeves may be in a single piece and communication means may be machined into them.

The oil circuit inlet (hot oil inlet) is via the cavity 57 in the lefthand flange 37 (FIG. 3) communicating with the bore 58 in the wall of the jacket 35 through which this cavity communicates with channels W and X. FIG. 3 shows the cavities 57, 59, 60 and 61 formed in the internal wall of the skirt 51 of the lefthand flange 37. These cavities communicate with the channels via the bores 63, 64, 65, 66, 67 and 68. In the same manner, in the internal surface of the skirt 52 of the righthand flange 38 there are formed cavities 71, 72, 73 and 74. These cavities communicate with the channels via the bores 76, 77, 78, 79, 80, 81 and 82 formed through the jacket 35 of the exchanger. The oil exit is via the cavity 71, the oil exiting from the three channels D, E and F via the bore 76. Thus the oil circuit may be traced through the exchanger: the circuit begins at the cavity 56 and then passes through the bore 58 and the two channels W, X in parallel in the direction from left to right. On the right (FIG. 4) the circuit exits the channels W, X and passes through the bore 82, the cavity 74 in the skirt 52 of the flange 38 and the bore 81, to rejoin the channels T, U through which it extends from right to left, and so on as far as the outlet cavity 71, the circuit ending with the three channels D, E and F in parallel, which provides for expansion of the oil and reduction of its flowrate at the end of the path.

The schematic diagram in FIG. 5 is a symbolic representation of the circuit described by way of example hereinabove. It shows the projection in a plane of channels A to X disposed at the periphery of the wall 32 of the central channel 31. The oil circuit comprises seven runs of the exchanger, the first six being formed by two juxtaposed channels in parallel and the final run comprising three channels in parallel. The diesel fuel circuit also comprises seven runs of the exchanger, a first run in the three channels A, B and C in series, and six runs in a single channel. The runs of the two fluids are in counterflow relationship and the two fluids exchange heat with the water which flows in the central channel 31.

This number of channels and this choice of paths are not limiting. The channels may have different directions. There may be more than one peripheral layer of them around the central channel. This is not a limiting condition either, as the water may flow in channels of various forms and arrangements.

The exchanger is preferably fabricated from a metal which is a good conductor of heat. It may be fabricated, for example, by casting, welding, assembling with screws, machining, etc, with appropriate seals where necessary.

A temperature regulation system 90 is shown in cross-section in the upper righthand part of FIG. 2. It comprises a chamber 91 adjacent the pre-heater tank 24 containing a temperature regulator 92 responsive to the temperature of the fuel and adapted to connect the fuel return pipe 11, 12 either to the pre-heater tank 24 or to the return pipe 14, 13 to the fuel tank 2, according to the temperature of the fuel reaching the chamber 91. In the embodiment shown, this chamber 1 is separated into two parts 91a and 91b by a thermostatic valve 92. The entry 12 for excess diesel fuel from the injector pump discharges into the part 91b, adjacent the tank 24, and communicating with the latter through the orifice 93. The pipe 13 returning diesel fuel to the tank 2 extends from the chamber 91a. The thermostat 92 has a two-fold function; when it establishes communication between the two chambers 91a, 91b it closes the orifice 93, and, conversely, when it opens the orifice 93, it shuts off communication between the two chambers 91a and 91b. The thermostat 92 operates for a set point temperature T which may be the temperature to which the diesel fuel is heated or a selected lower temperature. If the temperature of the diesel fuel returning from the injector pump 9 has not reached the value T, the thermostat is "up": the orifice 93 is open and the chamber 91a is isolated from chamber 91b. The diesel fuel returning from the injector pump enters the tank 24 and from there passes into the heat exchanger to be heated and returned towards the injector. When the temperature of the diesel fuel returning from the injector pump 9 has reached the value T, the thermostat goes to the "down" position. The orifice 93 is closed and the two chambers 91a and 91b are in communication. The diesel fuel returning from the pump then enters the pipe 13 via the outlet 14 to return to the tank 2. This simple system maintains the temperature of the diesel fuel at the selected value. It will be understood that other types of regulator could be used, employing temperature sensors and electronic systems.

The device described is simple and reliable. It provides a safe and economical means of heating diesel fuel.

It will be understood that various changes in the details, materials and arrangements of parts, which have been herein described and illustrated in order to explain the nature of the invention, may be made by those skilled in the art within the principle and scope of the invention as expressed in the appended claims.

I claim:

1. In an internal combustion diesel engine including means for circulating an engine cooling liquid through said engine, and means for circulating an engine lubricating oil through said engine for lubricating the moving parts thereof, a fuel tank for said engine, and a device for heating diesel fuel circulating from said fuel tank to said engine, the improvement wherein said device comprises a heat exchanger, three separate heat exchange circuits within said heat exchanger, including a first circuit for circulating engine cooling liquid from said engine, a second circuit for circulating fuel from said fuel tank to said engine, and a third circuit for circulating motor lubricating oil, and wherein said heat exchanger includes means defining separate heat exchange surfaces between said oil circuit and said fuel circuit, between said cooling liquid circuit and said fuel circuit and between said oil circuit and said cooling liquid circuit, for effecting simultaneously direct heat exchange between the fuel to be heated and the motor lubricating oil, and between the fuel to be heated and the engine cooling liquid, such that said diesel fuel passing through said heat exchanger absorbs heat from the relatively cool engine cooling liquid and is further heated by the hotter motor lubricating oil to a significantly higher degree than that available solely from the engine cooling liquid without danger of overheating the diesel fuel.

2. An internal combustion engine according to claim 1, wherein said heat exchanger comprises a central jacket including means defining a bundle of parallel channels, connecting means at respective ends of said central jacket for setting up said three separate circuits and including inlets and outlets for said oil, said cooling liquid, and said diesel fuel, each circuit comprising at least one run of said bundle of channels over the length of said central jacket, and said heat exchanger further comprising optional connection means at the ends of said bundle constituting at least one circuit formed of at least two channel runs extending the full length of said bundle.

3. An internal combustion diesel engine according to claim 1, wherein said connecting means at the ends of said central jacket comprise flanges, each of said flanges comprising cavities adapted to establish communication between at least two parallel channels within said central jacket.

4. An internal combustion diesel engine according to claim 2, wherein said central jacket comprises an outer cylindrical wall, an inner cylindrical wall, heat exchange fins integral with said inner cylindrical wall, said inner cylindrical wall defining an axial flow passage for said engine cooling liquid, and said inner and outer cylindrical walls defining said parallel channels and openings formed in channel side walls establishing communication between said channels and to the exterior of said heat exchanger.

5. An internal combustion diesel engine according to claim 1, wherein said device further comprises a preheater tank to one side of said heat exchanger, said preheater tank having an inlet for the fuel circuit connected to the diesel fuel tank, an electrical resistor within said preheater tank for preheating of the diesel fuel during starting of said diesel engine, and said preheater tank further comprising means for returning excess fuel from a fuel injection pump to said fuel tank if its temperature is greater than or equal to a set point temperature or to said heat exchanger if its temperature is less than said set point temperature.

6. An internal combustion diesel engine according to claim 5, wherein said preheater tank has at least one wall in common with said heat exchanger, said heat exchanger includes means defining an engine cooling liquid passage axially in line with the engine cooling liquid circuit of said heat exchanger, and wherein said common wall includes at least one other opening therein communicating the fuel oil within said preheater tank with said fuel circuit of said heat exchanger.

* * * * *